United States Patent [19]
Crooks

[11] 3,722,300
[45] Mar. 27, 1973

[54] POWER SHIFT PLANETARY TRANSMISSION

[75] Inventor: James W. Crooks, Milwaukee, Wis.

[73] Assignee: Allis-Chalmers Corporation, Milwaukee, Wis.

[22] Filed: Oct. 22, 1971

[21] Appl. No.: 191,717

[52] U.S. Cl. ........................74/15.63, 74/682, 74/705, 74/674
[51] Int. Cl. ........................F16h 37/00, F16h 37/06
[58] Field of Search.....74/682, 681, 674, 705, 15.63, 74/766, 767

[56] References Cited

UNITED STATES PATENTS

| | | |
|---|---|---|
| 2,511,039 | 6/1950 | Black et al..............................74/720 |
| 2,793,533 | 5/1957 | Swenson et al.....................74/15.63 |
| 2,827,805 | 3/1958 | Miller..............................74/682 X |
| 2,932,202 | 4/1960 | Rinkema ........................74/15.63 X |
| 3,065,643 | 11/1962 | Mark et al...........................74/15.63 |
| 3,430,518 | 3/1969 | Auriol..................................74/705 |
| 3,487,723 | 6/1970 | Piot.......................................74/682 |
| 3,487,724 | 1/1970 | McIntyre et al. .................74/15.6 X |

Primary Examiner—Arthur T. McKeon
Attorney—Arthur L. Nelson et al.

[57] ABSTRACT

A power shift planetary transmission having planetary gearsets and a clutch carrier for selectively providing a multiplicity of power paths at selective speed ratios through the transmission.

10 Claims, 5 Drawing Figures

| RANGE | BRAKES & CLUTCHES | TORQUE RATIO |
|---|---|---|
| R | 12-14 | -1.70 |
| 1 | 13-14 | 2.13 |
| 2 | 12-13 | 1.71 |
| 3 | 13-15 | 1.42 |
| 4 | 12-15 | 1.21 |
| 5 | 14-15 | 1.00 |

POWER SHIFT PLANETARY TRANSMISSION

This invention relates to a planetary power shift transmission and more particularly to a transmission having three planetary gearsets and a clutch carrier with power shift clutches and brakes for selectively operating the transmission at one of a plurality of speed ratios. The power input is applied to the first planetary gearset and selectively transmitted through the second and the third to the output shaft to provide five speeds forward and one speed in reverse of the transmission.

It is an object of this invention to provide a power transmission having three planetary gearsets and a rotatable clutch carrier mounted coaxially with the planetary gearset for selectively braking and clutching the elements of the planetary gearsets to provide a plurality of speed ratios and power paths through the transmission.

It is another object of this invention to provide a vehicle planetary transmission having three planetary gearsets and a clutch carrier rotating coaxially with power shifting means to selectively drive through elements of the planetary gearsets for the desired speed ratio through the transmission.

It is a further object of this invention to provide a vehicle power shifting transmission having three planetary gearsets rotating coaxially with a clutch carrier having clutching means on said carrier and braking means on the transmission housing to selectively drive through one of a multiplicity of power paths for providing the desired speed ratio for the transmission.

The objects of this invention are accomplished by employing three planetary gearsets rotating on coaxial centers. A clutch housing rotates about the same axial center and carries the plurality of clutches for selectively clutching the clutch carrier to a selected element on at least one of the elements of the planetary gearsets. A plurality of brakes are mounted on the transmission housing with means for selectively braking at least one element of the planetary gearset. The clutches and brakes are power operated to selectively drive through one of a plurality of power paths at a predetermined speed ratio through the transmission.

The preferred embodiments of this invention are illustrated in the attached drawings.

Figure 1:
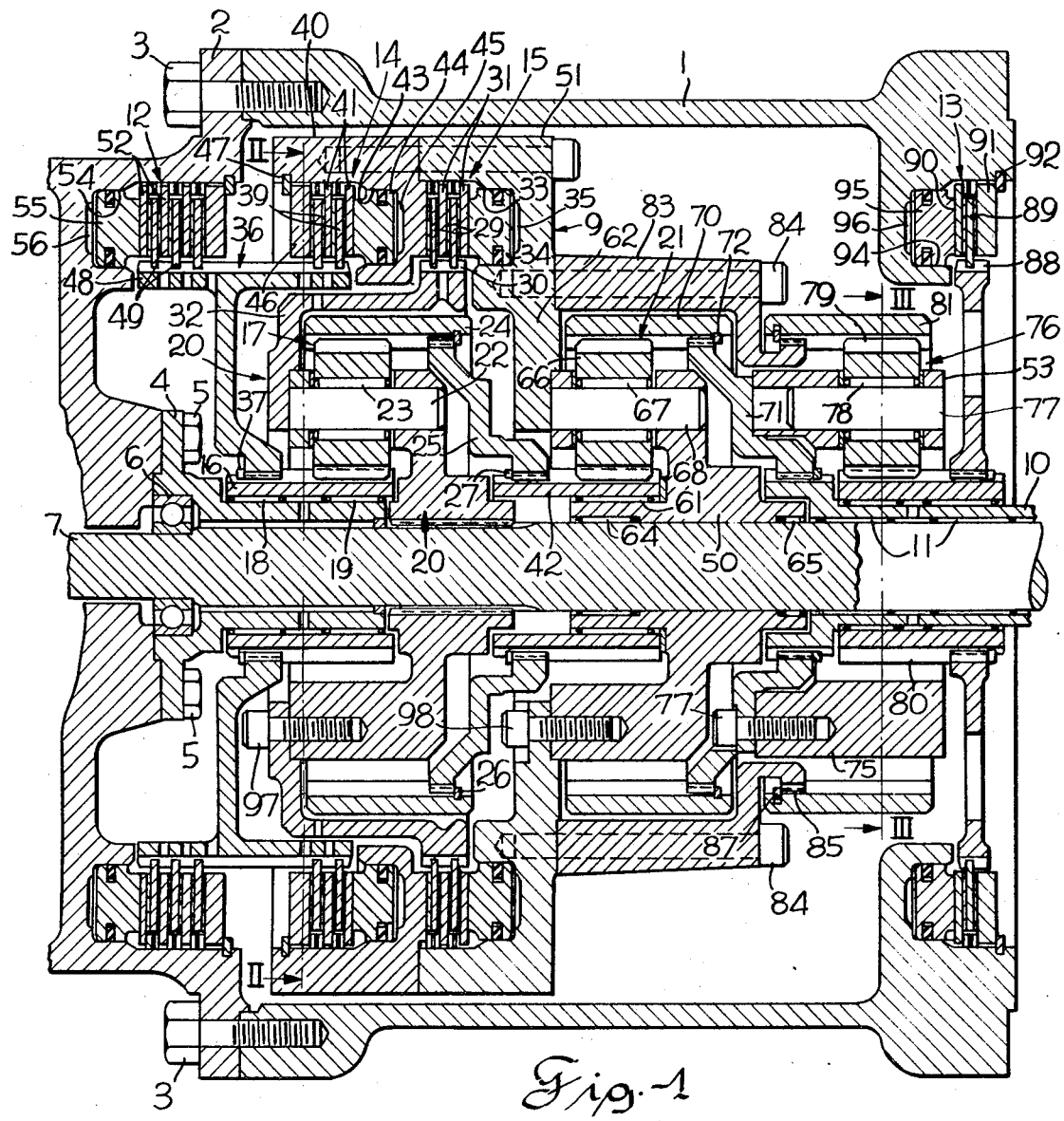
FIG. 1 illustrates a cross section view of the transmission.

Referring to the drawings, FIG. 1 illustrates a cross section view showing the transmission cut on an axis of the input and output drive.

The transmission housing 1 is fastened to the end plate 2 by means of a plurality of bolts 3. The end plate 2 carries the sleeve 4 and is fastened to the sleeve by a plurality of bolts 5. The sleeve 4 receives the bearing assembly 6 which rotatably supports the drive shaft 7. The drive shaft 7 extends axially through the transmission housing 1 and is adapted to operate as a power take-off shaft from the right hand end. The drive shaft 7 is received within the driven shaft 10 which is rotatably mounted on the needle bearing assemblies 11 positioned intermediate the two shafts. The right hand end of the shafts 7 and 10 are rotatably supported in suitable bearings, not shown, and are also provided with means for connection to a driven element.

The transmission includes a front brake 12 which is carried on the end plate 2. A rear brake 13 is carried on the transmission housing 1. A front clutch 14 and rear clutch 15 are both carried on the clutch carrier 9. The clutch carrier 9 includes means for connecting the clutch carrier to elements of the planetary gearsets which rotate coaxially with the clutch carrier.

The bearing retainer sleeve 4 provides support for the sun gear 16 of the front planetary gearset 17. The needle bearings 18 and 19 positioned on the bearing retainer sleeve 4 rotatably support the sun gear 16. Drive shaft 7 is splined for connection to carrier 20. The sun gear 16 engages a plurality of planet gears 17 supported on the planet carrier 20. The planet carrier 20 carries the plurality of pins 22, each embraced by the bearing assembly 23 to rotatably support a planet gear 17. Each of the planet gears mesh with the ring gear 24 which is supported on an annulus 25 through an external gear facing engaging the ring gear 24. The ring gear is undercut slightly and a snap ring 26 on the ring gear prevents axial movement of the ring gear 24 on the annulus 25 as well as the snap ring 27 on the sun gear 28 to prevent axial shifting of the annulus and sun gear 28.

The planet carrier 20 supports pin 22 and on the front side forms a radially extending portion 30 splined to receive the clutch disks 29 which are interposed between the clutch disks 31 which are carried on the clutch carrier 9. The bell housing 51 of clutch carrier 9 defines a hydraulic cylinder 33 which receives the hydraulic piston 34 forming the pressurizing chamber 35 for actuation of the clutch 15. Accordingly, the planet carrier 20 can be selectively clutched to the clutch carrier 9 by actuation of the clutch 15.

The sun gear 16 is splined to the clutch and brake hub 36 and is retained axially by the snap ring 37 on the external periphery of a portion of the sun gear. The clutch and brake hub 36 extend radially to form a spline facing on its external periphery. The facing extends axially rearward to support the rotating clutch disks 39. Interposed between clutch disks 39 are clutch disks 41 which are carried on the clutch carrier 9. The clutch carrier includes the sleeve 40 defining the hydraulic cylinder 43 which receives the piston 44 defining the pressurizing chamber 45 which is connected to the hydraulic actuating system. The pressure plate 46 is retained by the snap ring 47 received in an annular recess on its inner periphery. Accordingly, actuation of the clutch 14 provides clutching of the sun gear 16 to the clutch carrier 9 by selective operation of the hydraulic control system.

The clutch and brake hub 36 also includes a forwardly extending portion 48 which carries the rotating brake disks 49 which are interposed between the stationary brake disks 52 which are splined to the end plate 2. The end plate 2 forms the hydraulic brake cylinder 54 which receives the hydraulic brake piston 55 and forms a pressurizing chamber 56 which is connected to the hydraulic actuating system. Accordingly, the sun gear 16 can be braked by actuation of the brake 12 which is mounted on the end plate of the transmission casing.

The intermediate planetary gearset includes the sun gear 42 which is rotatably supported on the needle bearing assemblies 61 which are rotatably supported on the planetary carrier 50. The planet carrier 50 is rotatably mounted on the needle bearing assemblies 64 and 65 embracing the input shaft 7. The intermediate planetary gearset also includes planet gears 66 which are rotatably supported on bearing assemblies 67 embracing the pin 68 in the planet carrier portion 50 of the clutch carrier 9.

The ring gear 70 of the intermediate planetary gearset 21 meshes with the planet gear 66. The ring gear 70 is connected through the annulus 71 to the output shaft 10. The annulus 71 is splined on its external periphery to mate the gear teeth of the ring gear 70 and is axially aligned by the snap ring 72. The radially inner portion of the annulus 71 is also splined to the output shaft 10. The annulus 71 is bolted to the planet carrier 75 of the rear planetary gearset 76 by means of a plurality of bolts 77. The planet carrier 75 carries a plurality of pins 77 which are embraced by a plurality of bearing assemblies 78 rotatably supporting the planet gears 79. The planet gears 79 mesh with the sun gear 80 and the ring gear 81 of the rear planetary gearset 76.

The clutch carrier 9 extends rearwardly to form the sleeve 83 which is bolted to form the clutch carrier 9 by a plurality of bolts 84. A splined end 85 mates a portion of the ring gear 81 of the rear planetary gearset 76 and is retained axially by a snap ring 87.

Accordingly, the ring gear 81 of the rear planetary gearset 76 is connected to the clutch carrier 9 while the planet carrier 75 of the rear planetary gearset 76 is connected to the ring gear of the intermediate planetary gearset 21 and the output shaft 10.

The sun gear 80 of the rear planetary gearset 76 also carries a brake hub 88 which has a spline facing to carry the rotating brake disk 89 which frictionally engages the stationary brake disk 90 carried on the transmission housing 1. The reaction plate 91 is retained in position by the snap ring 92. The transmission housing defines a brake hydraulic cylinder 94 which receives the hydraulic piston 95 which defines the pressurizing chamber 96 for actuation of a rear brake 13.

The carrier portion 32 is connected to the planet carrier 20 by a means of a plurality of bolts 97 while the bell housing 51 of clutch carrier 9 is connected to the planet carrier 50 of the intermediate planetary gearset by a plurality of bolts 98.

Figures 4, 5:
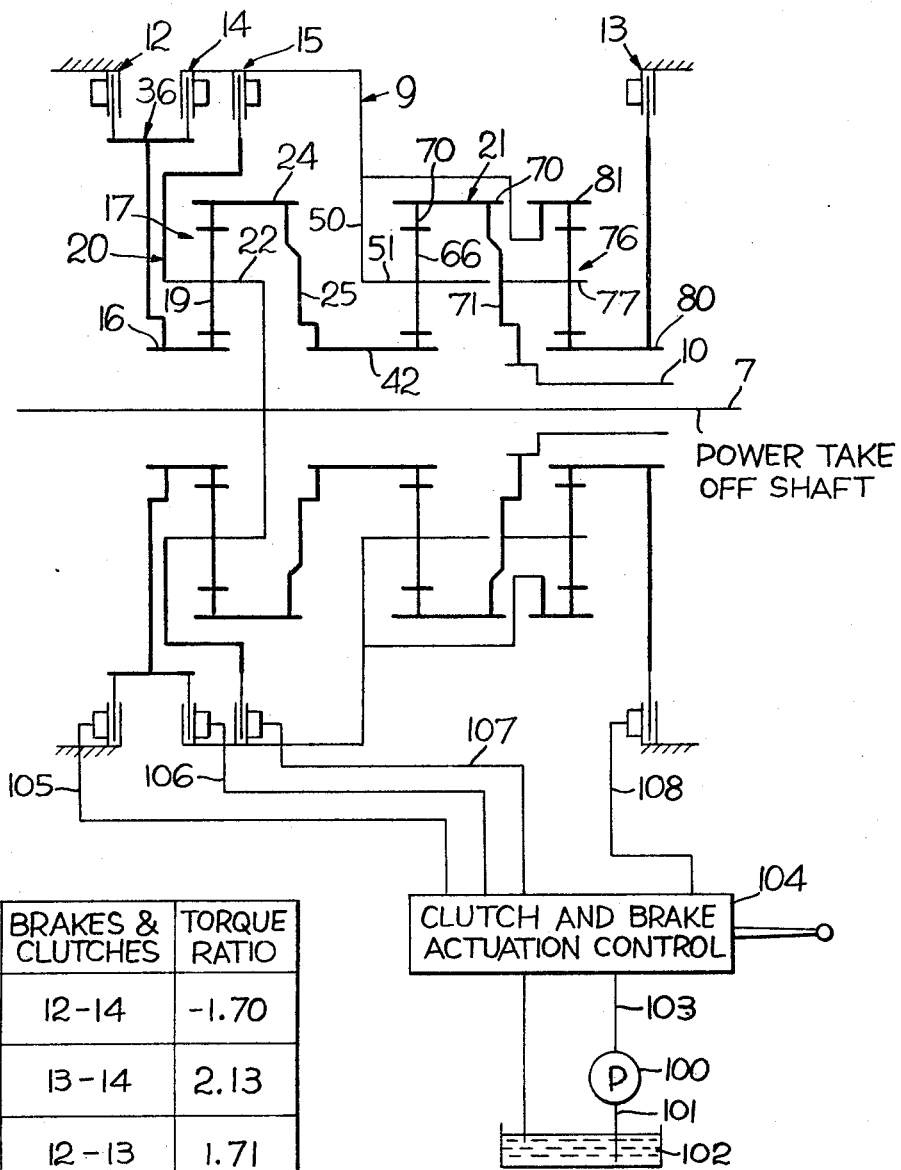
FIG. 4 is a schematic illustration of the transmission and the hydraulic actuating system.
FIG. 5 shows a chart of the torque ratios of the transmission with the brakes or clutches actuated to provide the torque ratio.

Referring to FIG. 4, the hydraulic system for actuation of the transmission is shown. The pump 100 receives hydraulic fluid through the conduit 101 extending from the reservoirs 102. Hydraulic fluid is pressurized in the conduit 103 and connected to the clutch and brake actuation valve 104 for selective actuation of one or more of the clutches or brakes. Connected to the control valve 104 are conduits 105, 106, 107 and 108 which are connected to the brake 12, the clutch 14, the clutch 15 and brake 13 respectively.

FIG. 5 illustrates the relative torque ratios of the transmission indicating the selective actuation of the clutches and brakes to provide a power path through the transmission and the torque ratio as shown.

The operation of the transmission will be described in the following paragraphs.

Figure 2:
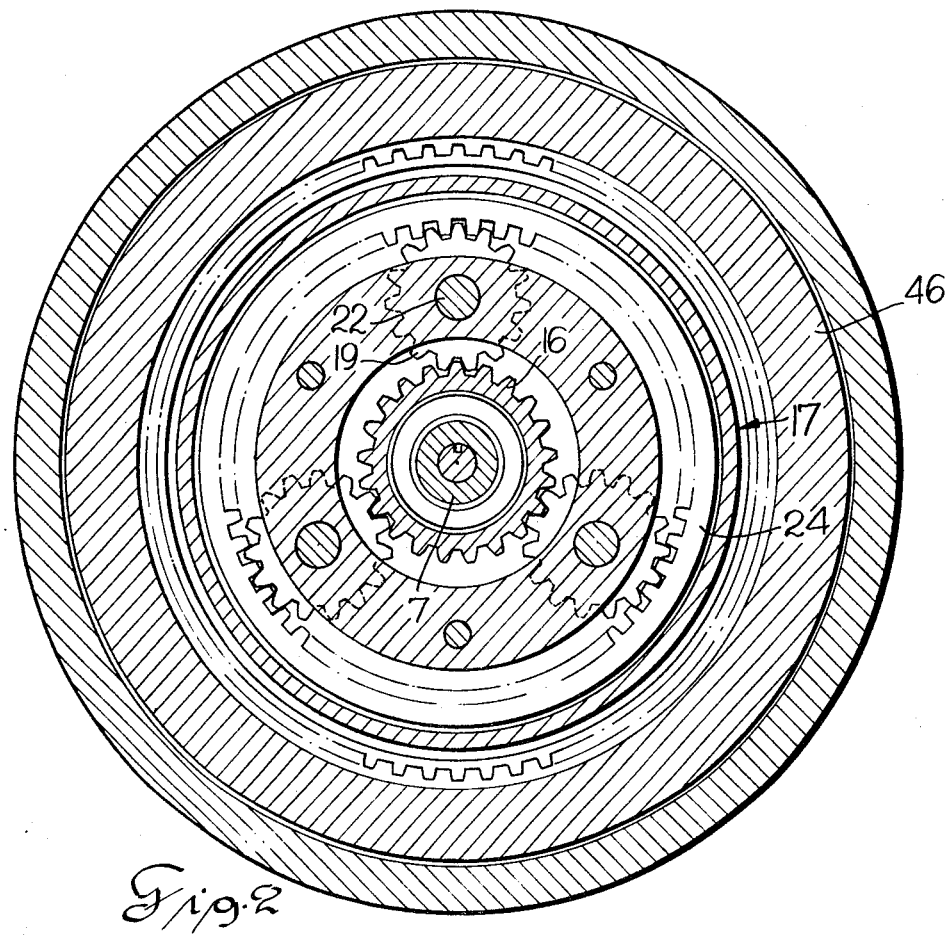
FIG. 2 illustrates a cross section view taken on line II—II of FIG. 1.
Figure 3:
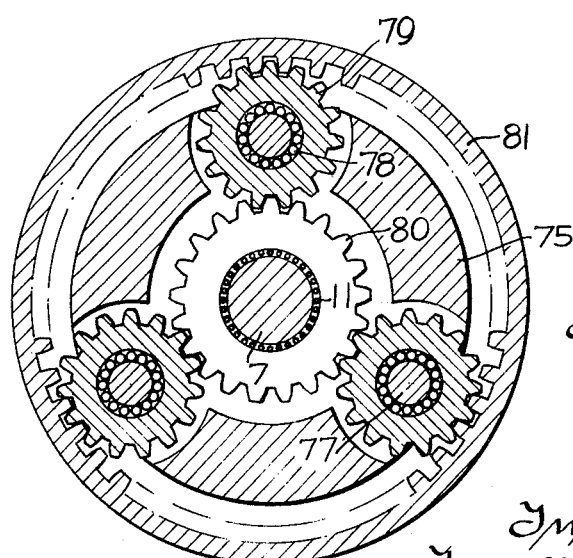
FIG. 3 illustrates a cross section view taken on line III—III of FIG. 1.

The transmission as shown in FIGS. 1, 2 and 3 and schematically illustrated in FIG. 4 provides five speed forward and one reverse speed. The drive shaft 7 drives directly through the transmission and operates as a power take-off shaft with provisions for power take-off on the rear end of the input shaft 7. The driven shaft 10 is also provided for driving the vehicle by suitable connection to gears and the final drive assembly of the vehicle. Referring to FIG 4, the clutch and brake actuation control valve 104 has provisions for sequentially actuating the clutches and brakes of the transmission. The actuation of the selected clutch and brake provides for one of a plurality of power paths through the transmission which provides the desired speed ratio and the direction rotation of the transmission.

When the front brake 12 and the front clutch 14 are actuated, the transmission is operating in reverse. The input torque passes from the carrier 20 to its mating ring gear 24 in the front planetary gearset 17. The brake 12 locks the sun gear 16 to the transmission housing 1 while the clutch 14 clutches the carrier 50 of the intermediate planetary gearset 21 through the connecting braking clutch hub 36 to the brake 12. Torque from the ring gear 24 is supplied to the sun gear 28. With the carrier 50 locked with the transmission housing, a torque multiplication is imposed on the ring gear 70 causing it to turn in the negative direction. This torque is passed on to the connecting output shaft 10 to drive the output shaft 10 in the reversed direction operating the transmission in reverse.

When the transmission is placed in first gear the clutch 14 and brake 13 are actuated. The input torque passes from the carrier 20 to its mating sun gear 16 and ring gear 24 in the front planetary gearset 17. Positive torque is transferred to both the sun gear 16 and the ring gear 24. The ring gear 24 supplies negative reaction torque at sun gear 42 in the intermediate planetary gearset 21. The sun gear 16 of the first planetary gearset 17 is connected through the clutch 14 on clutch carrier 9 to the planet carrier 51 of the second planetary gearset 21 and the ring gear 81 in the rear planetary gearset 76. Positive torque multiplication is transferred to carrier 51 from the negative reaction torque of sun gear 42. This positive torque combines with the positive torque imposed on the sun gear 16 and becomes a negative reaction torque at the ring gear 81 of the rear planetary gearset 76. The sun gear 42 when combined with high positive torque multiplication imposed on the carrier 75 of the third planetary gearset 76 by locking the sun gear 80 and using the rear brake 13 results in a high numerical torque ratio multiplication on the output shaft 10.

When the transmission is positioned in second speed forward, the front brake 12 is actuated and the rear brake 13 is actuated. The input torque passes to the carrier 20 of the front planetary gearset 17. The sun gear 16 is locked to the transmission housing by the front brake 12. Torque from the carrier 20 is transferred as positive torque to the ring gear 24 becomes a negative reaction torque at the sun gear 42 in the intermediate planetary gearset 21. The carrier 62 of the intermediate planetary gearset 21 in turn is supplied with a positive torque multiplication which becomes a negative reaction torque at the ring gear 81 of the rear planetary gearset 76. The sun gear 42 of the intermediate planetary gearset 21 also supplies the ring gear 70 with a negative torque which when combined with the high positive torque multiplication imposed on the carrier 75 of the rear planetary gearset 76 by locking the sun gear 80 to the transmission housing through the brake 13 results in negative torque at the output shaft 10.

When the transmission is in third gear the rear clutch 15 and the rear brake 13 are actuated. The input torque passes through the front carrier 20 of the front planetary gearset 17 through the rear clutch 15 and clutch carrier 9 to the ring gear 81 of the rear planetary gearset 76. The rear brake 13 locks the sun gear 80 of the rear planetary gearset 76 to the transmission housing causing a positive torque multiplication imposed on the carrier 75 of the rear planetary gearset 76 and to the connecting output shaft 10.

When the transmission is in the fourth gear, the front brake 12 and the rear clutch 15 are actuated. The input torque passes through the carrier 20 of the front planetary gearset 17 to the carrier 51 in the middle planetary gearset 21 through the rear clutch 15. The carrier 51 transfers negative torque to the sun gear 42 which becomes a positive reaction torque at the ring gear 24. With the front brake 12 locking the sun gear 16 of the front planetary gearset 17 to the transmission housing a driving torque is created in the carrier 20 combining with the input torque from the input drive shaft 7. A driving torque is induced in the ring gear 70 from the sun gear 42 of the intermediate planetary gearset 21. This torque is passed on to the connected output shaft 10 through the annulus 71.

When the transmission is in the fifth speed, the front and rear clutches 14 and 15 are actuated. The input torque passes to the carrier 20 in the front planetary gearset 17 and to the rear clutch 15. The clutch 15 connects through clutch carrier 9 to clutch 14 which is connected to the sun gear 16. The front planetary gearset is thereby locked together. The ring gear 24 of the front planetary gearset 17 is connected to the sun gear 42 of the intermediate planetary gearset 21 and the clutch carrier 9 is connected to the planetary carrier 50 of the intermediate planetary gearset. Therefore, the intermediate planetary gearset 21 is locked together and both planetary gearsets will rotate together thereby giving direct drive to the output shaft 10 through the annulus 71.

The preferred embodiments of this invention have been illustrated and described through five speeds forward and one reverse in response to selective actuation of the clutches or brakes as described above.

The embodiments of the invention in which an exclusive property or privilege is claimed are defined as follows:

1. A vehicle transmission comprising, a transmission housing, an input drive shaft rotatably mounted in said housing, an output drive shaft rotatably mounted coaxially with said input shaft in said housing, a front planetary gearset, an intermediate planetary gearset and a rear planetary gearset mounted coaxially with said input shaft and said output shaft, a clutch carrier rotatably mounted for coaxial rotation with said planetary gearsets, each of said planetary gearsets having the elements including a sun gear, a ring gear, planet gears, and a planetary carrier, means connecting said input drive shaft with the planetary carrier of the front planetary gearset, means connecting the ring gear of said first planetary gearset with the sun gear of said second planetary gearset, means connecting the ring gear of said intermediate planetary gearset with the planetary carrier of said rear planetary gearset and said output drive shaft, means connecting the planetary carrier of said intermediate planetary gearset and the ring gear of said rear planetary gearset with said clutch carrier, a plurality of clutches mounted on said clutch carrier including friction means connected to at least one of said elements of said front planetary gearset for clutching said element to said clutch carrier, a plurality of brakes mounted on said transmission housing including friction means connected to at least one element of said front planetary gearset and said rear planetary gearset for braking said element to said transmission housing, control means including actuating means for selectively actuating at least one of said clutches or brakes to provide one of a plurality of power paths at selected speed ratios through said transmission.

2. A vehicle transmission as set forth in claim 1 wherein said friction means in one of said brakes includes means connected to the sun gear of said first planetary gearset and said friction means in one of said clutches includes means connected to the sun gear of said front planetary gearset to lock the sun gear of said first planetary gearset to the transmission housing while said clutch locks the planetary carrier of the intermediate planetary gearset to the transmission housing to thereby provide a power path through the planetary carrier of said front planetary gearset causing a negative rotation of the ring gear of the second planetary gearset and thereby rotate the output shaft in a reverse direction when said transmission is in operation.

3. A vehicle transmission as set forth in claim 1 wherein said friction means in one of said clutches includes means connected to the sun gear of the front planetary gearset and said friction means in one of said brakes includes means connected to the sun gear of the rear planetary gearset to thereby provide a high torque ratio at the output shaft when the transmission is operated.

4. A vehicle transmission as set forth in claim 1 wherein said friction means in said plurality of brakes includes means connected to the sun gear of the first planetary gearset and means connected to said sun gear of the rear planetary gearset to provide a high positive torque in a forward speed of rotation on the output shaft when said transmission is operated.

5. A vehicle transmission as set forth in claim 1 wherein said friction means in said plurality of clutches includes means connected to the planetary carrier of the front planetary gearset and said friction means in said plurality of brakes includes means connected to the sun gear of the rear planetary gearset to transmit torque from the planetary carrier of the front planetary gearset to the ring gear of the rear planetary gearset to provide a positive torque imposed on the planetary carrier of the rear planetary gearset when said transmission is operated.

6. A vehicle transmission as set forth in claim 1 wherein said friction means in said plurality of brakes includes means connected to the sun gear of first planetary gearset, said friction means in said plurality of clutches includes means connected to the planetary carrier of said front planetary gearset to provide an input torque through the planetary carrier and the first planetary gearset through the intermediate planetary gearset to thereby provide a driving torque on the planetary carrier of the rear planetary gearset to drive the output shaft.

7. A vehicle transmission as set forth in claim 1 wherein said friction means in said plurality of clutches includes means connecting to the sun gear of the front planetary gearset and means connected to the planet carrier of said front planetary gearset whereby actuation of the clutches lock the front planetary gearset and the intermediate planetary gearset causing the planetary gearsets to rotate together thereby giving a direct drive to the output shaft.

8. A vehicle transmission as set forth in claim 1 wherein said input drive shaft includes means defining a power take-off shaft on the rear end of said shaft for simultaneously providing power take-off from said input drive shaft while driving to said transmission.

9. A vehicle transmission as set forth in claim 1 wherein said output shaft defines a quill shaft, means rotatably mounting said input shaft in said output shaft to thereby provide an output drive from said vehicle transmission.

10. A vehicle transmission as set forth in claim 1 wherein said clutch carrier includes means connected to the planetary carrier on the intermediate planetary gearset, means rotatably supporting said planetary carrier on said input drive shaft to thereby provide concentric rotation of said intermediate planetary gearset and said clutch carrier on said input drive shaft.

* * * * *